UNITED STATES PATENT OFFICE.

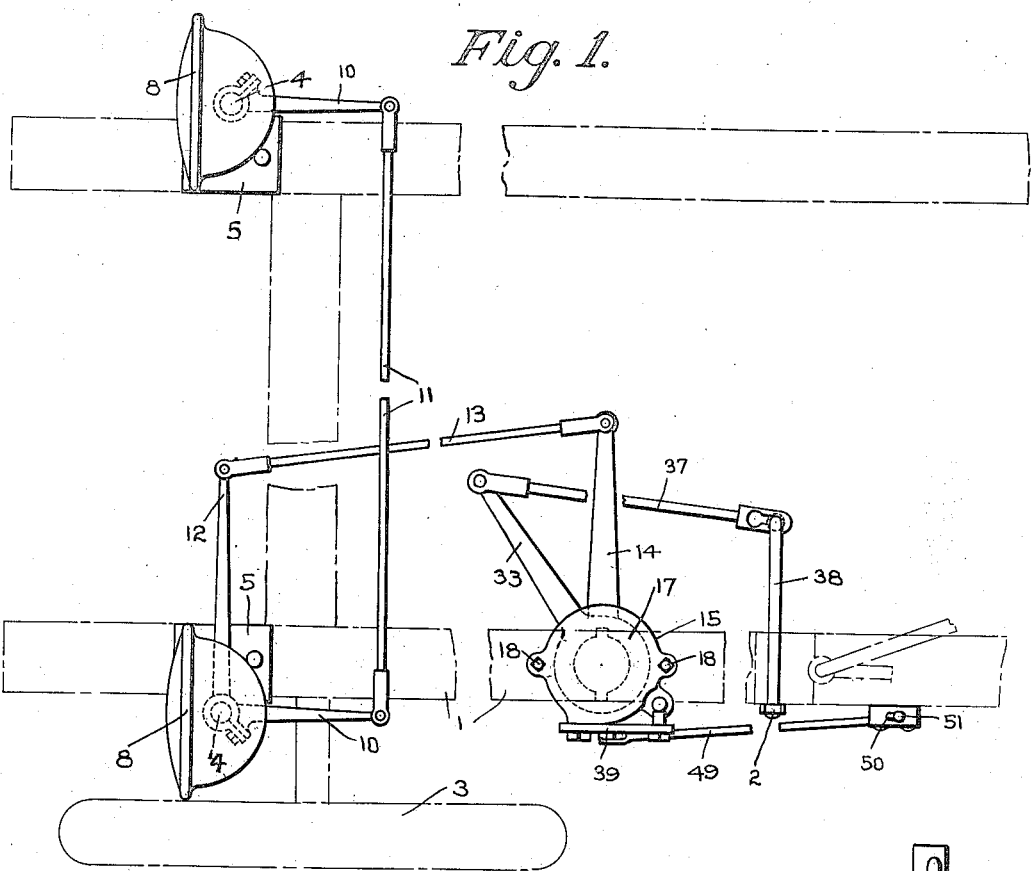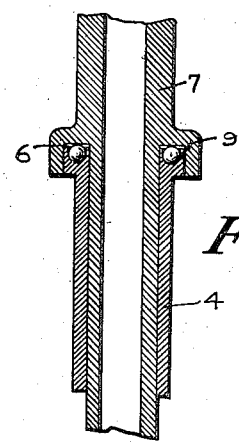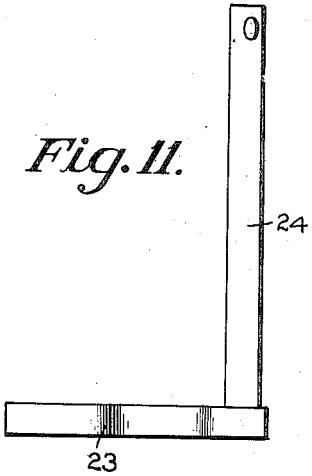

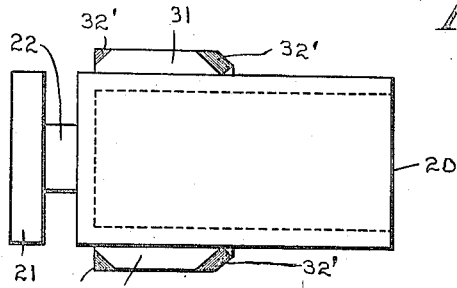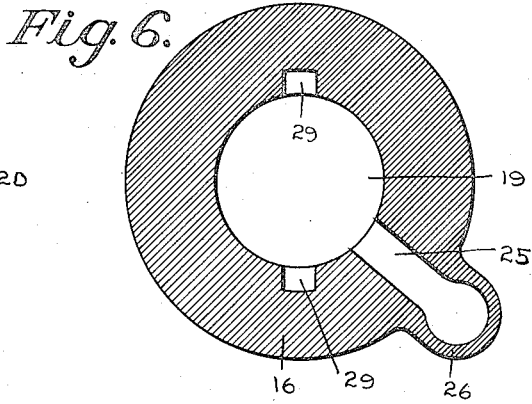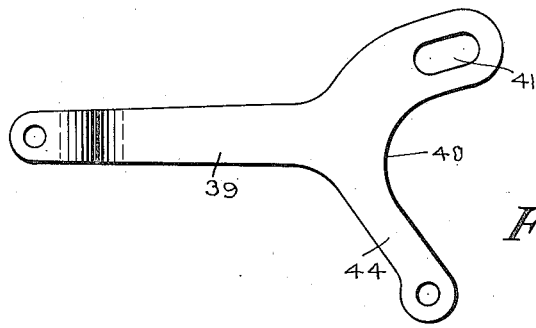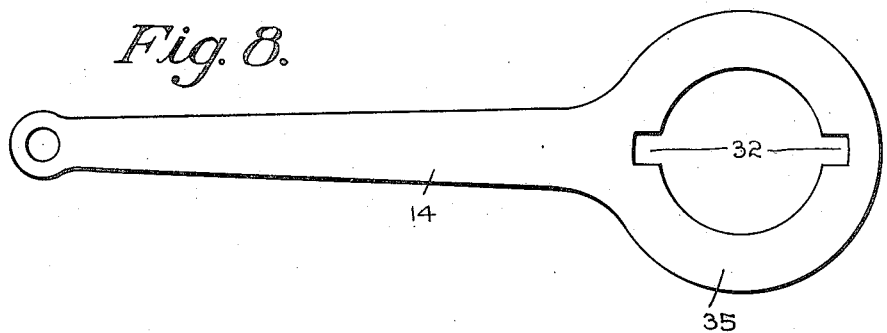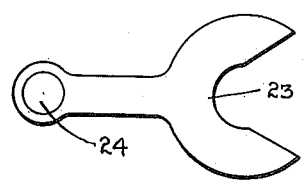

JOHN D. N. SIMPSON, OF SPARTANBURG, SOUTH CAROLINA.

AUTOMATIC AUTOMOBILE HEADLAMP.

1,418,982.  Specification of Letters Patent.  Patented June 6, 1922.

Application filed November 2, 1920. Serial No. 421,263.

*To all whom it may concern:*

Be it known that I, JOHN D. N. SIMPSON, a citizen of the United States, residing at Spartanburg, in the county of Spartanburg and State of South Carolina, have invented certain new and useful Improvements in Automatic Automobile Headlamps; and I do hereby declare the following to be a full, clear, and exact description of the invention, such as will enable others skilled in the art to which it appertains to make and use the same.

This invention relates to new and useful improvements in automatic automobile head lamps and has for its primary object the provision of means for connecting the head lamps of an automobile to the steering mechanism, so that said lamps may be compelled to move in a corresponding direction with the front wheels of the automobile or be permitted to remain stationary if desired.

Another object of this invention is the provision of means under the control of the operator whereby the movement of the lamps with the front wheels may be discontinued and the lamps locked against accidental movement and in a position to direct the rays of light therefrom directly in front of the automobile.

A further object of this invention is the provision of automatic automobile head lamps of the above stated character which will be simple, durable and efficient, and which may be manufactured and sold at a comparatively low cost.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which:—

Figure 3:
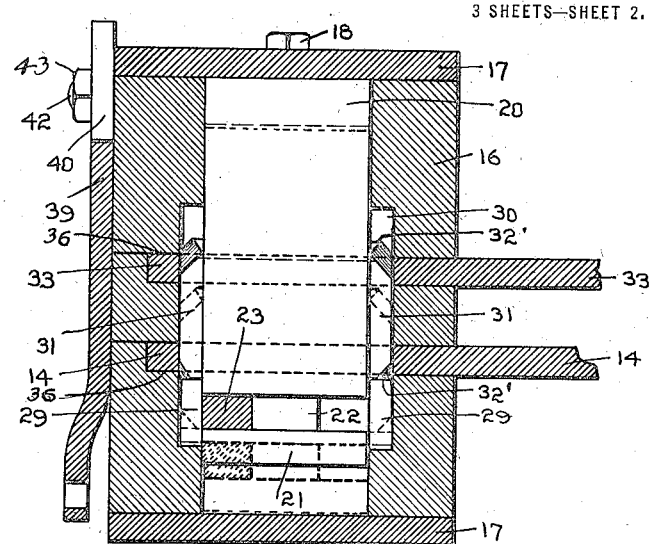
Figure 4:
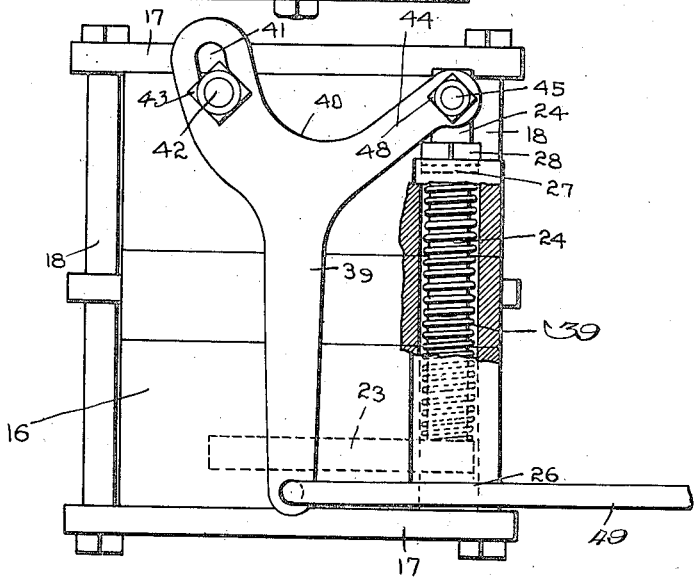
Figure 10:
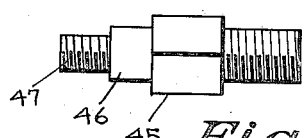

Fig. 1 is a top plan view, illustrating automatic automobile head lamps constructed in accordance with my invention, Fig. 2 is a fragmentary sectional view, illustrating the mounting of the lamp standard, Fig. 3 is a vertical sectional view illustrating the means of connecting and disconnecting the lamps with the steering mechanism, Fig. 4 is a side elevation, illustrating the same, Fig. 5 is a detail view, illustrating the locking member, Fig. 6 is a transverse sectional view, illustrating the shell or casing for the locking member, Fig. 7 is a plan view illustrating an actuating arm, Fig. 8 is a plan view, illustrating a locking arm, Fig. 9 is a detail end view, illustrating the fork of the shifting member, Figure 10 is a detail view illustrating a coupling, Figure 11 is a detail view illustrating the shifting member.

Referring in detail to the drawings, the numeral 1 indicates a chassis or frame of an automobile having the usual steering arm 2 adapted to be actuated by the ordinary steering mechanism (not shown) and which is adapted to be connected to the front wheels 3 in the usual manner. Tubular supporting members 4 are secured to the forward end of the frame or chassis 1 by brackets 5 and have formed in their upper ends ball races 6 to receive ball bearings. Lamp standards 7 carrying suitable head lamps 8 extend through the tubular supporting members 4 and have formed thereon cups 9 adapted to bear upon the ball bearings and also overlie the ball bearing races 6 in the upper ends of the members 4. The lamp standards 7 extend entirely through the members 4 and are of hollow formation, so that the electric wires for the electric lamps in the head lamps 8 may readily enter said head lamps from a point below the frame.

Arms 10 are secured to the lower ends of the lamp standards and are connected by a connecting rod 11 extending transversely of the automobile so that the head lamps will be compelled to move in unison.

One of the arms 10 has formed integrally with same an arm 12 which extends at right angles to said arm 10 and is pivotally connected to a connecting rod 13. The connecting rod 13 extends rearwardly and is pivotally connected to the end of an actuating arm 14. The arm 14 is associated with a connecting and disconnecting means 15 that includes a sectional shell or casing 16 which has its ends closed by removable plates 17. The removable plates 17 are held on the casing or shell by means of bolts 18 that also may extend through the frame or chassis 1. The connecting and disconnecting means 15 may be located on the inside of the frame or be located upon the outside of said frame by simply reversing the position of the arm 14. The shell or casing 16 has a bore 19 in which is slidably mounted a locking member 20. The locking member 20 has formed on one end a head 21 which is spaced from said end of the locking member by a neck 22 and is adapted to be engaged by a fork 23 formed upon a shifting member 24. The shifting member 24 extends through a slot 25 in the casing or shell and is slidably mounted in a bracket or ear 26 formed on the exterior of the casing or shell and which is internally screw threaded to receive the screw threaded shank 27 of an adjusting nut 28. The shell or casing is provided with oppositely disposed grooves 29 adjacent one end of the bore 19 and said grooves communicate with an annular groove 30 formed in the casing or shell and in communication with the bore 19. The locking member 20 has formed thereon oppositely disposed ribs 31 that have their ends beveled as illustrated at 32' so that they will readily enter the grooves 29 and grooves 32 formed in an actuating arm 33.

The arms 14 and 33 have formed thereon hubs 35 provided with the oppositely disposed grooves 32 and the hubs surround the locking member 20 and fit within annular recesses 36 formed in the casing or shell while said arms extend outwardly of the shell or casing by way of slots.

The hubs of the arms 14 and 33 are relatively spaced so that when the locking member 20 is in one position or with the ribs 31 in the grooves 29, the arm 33 will be free to turn in relation to the arm 14 and also the locking member 20 and when said locking member is moved to another position, the ribs 31 enter the grooves 32 of the arm 33 locking said arm to the locking member so that on movement of the arm 33 the arm 14 will be moved with the same, causing the movement of the head lamps. The arm 33 is connected to a connecting rod 37 by a ball and socket connection and said connecting rod is in turn connected to an arm 38 by a ball and socket connection and said arm 38 is connected to the steering arm 2 so that on movement of the steering arm by the usual steering mechanism, the arm 33 will be moved accordingly and if said arm 33 is locked to the arm 14, the head lamps will be compelled to move in the same direction as the front wheels of the automobile so that the rays of light from the lamps will be directed in the path of the automobile when traveling upon a curve.

A controlling lever 39 is provided with a forked portion 40 having a slot 41 in one of its arm portions that receives a stud 42 formed on the shell or casing and said arm portion is retained on the stud by means of a nut 43. The other arm portion 44 of the fork 40 is connected to the end of the actuating fork member 24 by means of a coupling 45. The coupling 45 has threaded connection with the fork member 24 and is provided with a bearing portion 46 that extends through an opening in the arm portion 44 of the fork and said bearing portion has a reduced screw threaded portion 47 that receives a nut 48 to prevent the coupling 45 from becoming detached from the arm portion 44 of the fork. A connecting rod 49 is pivoted to the end of the controlling lever 39 and to the end of an operating lever 50. The operating lever 50 is pivotally mounted on the automobile and in convenient reach of the operator and is provided with a suitable catch 51 for holding the same in a position to cause the member 20 to couple the arms 33 and 14 together and against the action of the spring 39' so that when the lever 50 is released the spring 39' will move the member 20 downwardly to uncouple the arms 13 and 14 and to lock the arm 14 against rotation by the ribs 31 entering the grooves 29. It is to be understood that the action of the spring is to normally position the parts so that the arm 13 is free to turn relative to the arm 14 and the latter held against rotation, consequently preventing accidental movement of the head lamps from a position where they cast their rays of light straight ahead of the automobile. The operator pushing the lever 50 in the direction before mentioned causes the arm 39 to move which in turn moves the forked member 24 upwardly to position the locking member 20 in the upper portion of the casing with its ribs 31 disengaged from the grooves 29 and into engagement with the grooves 32 of the arms 33 and 14, consequently coupling said arms together, whereby the movement of the steering mechanism will be transmitted to the head lamps and cause them to move in a corresponding direction with the movement of the front wheels of the automobile. The operator on releasing the lever 50 from said position, permits the spring 39' to act to return the locking member 20 to the lower portion of the casing to disengage the ribs from the grooves 32 of the arm 33 and position said ribs in the grooves 29 to lock the arm 14 against rotation and permit the arm 33 to move with the steering mechanism. The arm 14 being locked against movement prevents accidental turning movement of the head lamps.

While I have shown and described the preferred embodiment of my invention, it will be understood that minor changes in construction, combination, combination and arrangement of parts may be made without departing from the spirit and scope of the invention as claimed.

Having thus described my invention what I claim is:

1. An operating device for a dirigible head lamp comprising a casing having grooves, a locking element slidably and rotatably mounted in the casing, arms journaled on said element and connected respectively to a head lamp and to a steering mechanism, said arms having grooves, ribs on said element, and operating means to slide said element in either direction to position the ribs in the grooves of the arms to couple the arms together and to position the ribs in the grooves of the casing and in the grooves of one of the arms to lock the latter against movement and to permit the other arm to turn freely on said elements.

2. An operating device for a dirigible head lamp comprising a casing, arms movably supported by the casing and connected respectively to a head lamp and to a steering mechanism, a combined coupler and lock adapted when in one position to couple the arms together and when in a second position to uncouple the arms and to lock one of said arms against movement, and means for normally urging said combined coupler and lock into said second position, and means for moving and holding the combined coupler and lock into said first position.

3. An operating device for a dirigible head lamp comprising a casing, arms associated with the casing and connected respectively to a head lamp and to a steering mechanism, a locking element in said casing for coupling the arms together when in one position and to uncouple said arms and to lock one of the arms against movement when in a second position, an actuating arm carried by said casing, means for connecting said arm to the element and adapted to normally urge the same into its second position, and means connected to the arm for moving and holding said element in its first position.

4. An operating device for a dirigible head lamp comprising a casing, arms associated with the casing and connected to a head lamp and to a steering mechanism, a locking element in said casing for coupling the arms together when in one position and to uncouple said arms and to lock one of the arms against movement when in a second position, an actuating arm carried by said casing, a rod connecting the arms of said elements and slidably supported, tension means engaging said rod to position the element in a second position, and means connecting the said arms for moving and holding said element in its first position.

In testimony whereof I affix my signature in presence of two witnesses.

JOHN D. N. SIMPSON.

Witnesses:
B. T. SMITH,
LEE BUSLEY.